United States Patent [19]

Setter

[11] Patent Number: 4,913,345
[45] Date of Patent: Apr. 3, 1990

[54] HIGH PRESSURE WASHER/FIELD SPOT SPRAYER

[75] Inventor: Gregory K. Setter, Russell, Canada

[73] Assignee: Setter Triple S Ltd., Russell, Canada

[21] Appl. No.: 284,306

[22] Filed: Dec. 14, 1988

[51] Int. Cl.[4] .............................................. B05B 9/03
[52] U.S. Cl. ..................................... 239/127; 239/142; 239/172; 239/304; 239/445
[58] Field of Search ................. 239/172, 310, 443–445, 239/722, 142, 159, 170, 304, 307, 124, 126, 127

[56] References Cited

U.S. PATENT DOCUMENTS

| | | | |
|---|---|---|---|
| 1,548,383 | 8/1925 | Pickersgill | 239/170 X |
| 3,075,546 | 1/1963 | Roberts et al. | |
| 3,589,614 | 6/1971 | Linville | |
| 3,630,234 | 12/1971 | Hoffman | |
| 4,135,669 | 1/1979 | Bridges et al. | |
| 4,213,796 | 7/1980 | Shaffer | 239/172 X |
| 4,333,609 | 6/1982 | Backo | |
| 4,541,565 | 9/1985 | Deimerly et al. | 239/752 X |
| 4,602,742 | 7/1986 | Penson | 239/172 |
| 4,664,137 | 5/1987 | Leorat et al. | |
| 4,725,004 | 2/1988 | Baran, Jr. | 239/172 X |

FOREIGN PATENT DOCUMENTS 255859 12/1964 Australia .............................. 239/310

Primary Examiner—Andres Kashnikow
Assistant Examiner—William Grant
Attorney, Agent, or Firm—Murray E. Thrift; Stanley G. Ade; Adrian D. Battison

[57] ABSTRACT

A sprayer serves as a small capacity agricultural or lawn sprayer with spot spraying capacity. It is also used for high pressure spraying, such as a high pressure washer. The sprayer has a cone bottom tank of 2 to 200 gallon capacity which supplies a high pressure pump. A high pressure regulator controls the output of the pump and provides the high pressure supply for a high pressure washing wand. The output of the regulator may also be reduced so that the washing wand can be used for spot spraying. The output of the high pressure regulator is also supplied to a valve which, when opened, supplies liquid to a variable agitator valve for returning water to a jet agitator in the tank. Liquid from the valve is also supplied to a low pressure regulator and an on-off spray valve. The low pressure regulator regulates the pressure to the spray valve which feeds a spray boom unit for spraying agricultural chemicals and the like.

23 Claims, 5 Drawing Sheets

HIGH PRESSURE WASHER/FIELD SPOT SPRAYER

The present invention relates to spraying apparatus and more particularly to a sprayer of small physical size that can be used for both high pressure and low pressure spraying, as for example in high pressure spray washing and low pressure spraying of agricultural chemicals.

BACKGROUND

In the prior art, it has been common to require two or more different sprayers for carrying out different spray operations. For example, a small size agricultural or lawn type sprayer may be used for low pressure field, lawn and spot spraying while a separate apparatus is required for use as a high pressure washer. The objective of the present invention is to combine in a single, small sized apparatus, the ability to perform almost any spray function, whether high pressure or low pressure.

SUMMARY

According to the present invention there is provided a spraying apparatus comprising:

a tank for liquid to be sprayed;

a high pressure pump with an inlet connected to the tank to receive liquid therefrom;

a high pressure regulator connected to the pump to receive liquid therefrom at high pressure and to deliver liquid at a controlled high pressure;

high pressure spray means connected to the high pressure regulator to receive liquid at the controlled high pressure and selectively operable to deliver a high velocity spray of liquid;

high pressure valve means connected to the high pressure regulator to receive liquid at the controlled high pressure for selectively delivering the liquid therefrom;

a low pressure regulator connected to the high pressure valve means to receive liquid therefrom and for providing a supply of the liquid at a controlled low pressure; and low pressure spray means connected to the low pressure regulator to receive liquid at the controlled low pressure and for delivering the liquid in a controlled low velocity spray.

The two pressure regulators are preferably independently adjustable so that the "high pressure" spray, which is preferably a spray wand, may be used both for high pressure washing and for spot spraying of agricultural chemicals at relatively low pressure. The low pressure spray is preferably a spray boom with fold up, break away ends.

The preferred tank is a cone bottom tank of between 2 and 200 gallons capacity. A small, cone bottom tank of this sort is not known to be used in sprayers. It is however, particularly advantageous in the multipurpose sprayer of the present invention as it allows the complete washing out of the tank after it has been used for a specific application. The tank is preferably equipped with a jet agitator, supplied with liquid from the line joining the high pressure and low pressure regulators. The agitator is therefore only activated when the high pressure valve is opened for low pressure spraying. The agitator line is preferably valved with a variable valve so that the quantity of liquid supplied to the agitator can be controlled.

For such applications as high pressure washing or spot spraying using a wand, the apparatus may be equipped with an additive tank, for liquid additives to be injected into the pump to be mixed with water from the tank. In washing applications, the additive will usually be soap or detergent.

A three way valve can be fitted in the supply line from the tank to the high pressure pump so that water supply can be switched from the tank to an external source, for example a garden hose.

The pump is preferably continuously driven by a gasoline motor. A by-pass from the high pressure regulator to the pump recycles excess liquid from the regulator. The low pressure regulator is a pressure relief type of regulator that returns excess liquid to the tank through a return line.

The sprayer may be equipped with a three point hitch, trailer or skid mount as desired.

BRIEF DESCRIPTION OF THE DRAWINGS

In the accompanying drawings, which illustrate an exemplary embodiment of the present invention.

DETAILED DESCRIPTION

Figure 1:
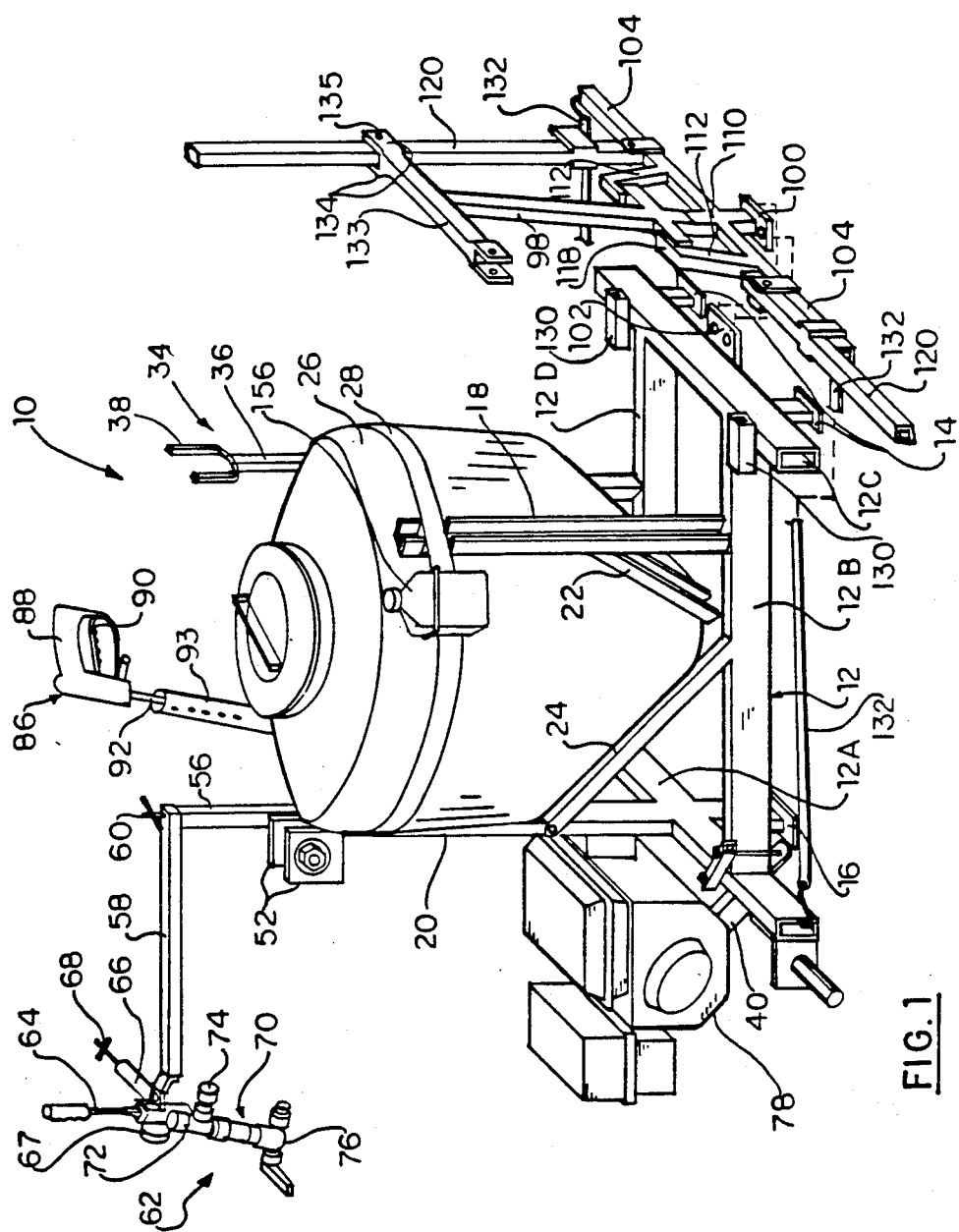
FIG. 1 is an isometric view of a sprayer according to the present invention, with the various fluid lines omitted for the sake of clarity.

Referring to the accompanying drawings, especially FIG. 1, there is illustrated a sprayer 10 with a generally rectangular base frame 12 made of rectangular tubular sections 12a–12d. Along the rear side 12c of the sprayer, the frame is supported on two feet 14, while at the front 12a it is supported on a single, central foot 16. On opposite sides 12b and 12d of the frame are two upstanding channel section standards 18. A similar channel section standard 20 extends upwardly from the center of the front frame side 12a. Each of these three standards is equipped with a downwardly sloping tank support 22 of channel section. The three supports converge towards a common central point. The front standard 20 is also connected to two angle braces 24 that join the standard to the sides 12b and 12d of the base frame 12. The three standards and their tank supports 22 support a cone bottom tank 26 on the base frame. The tank is secured to the three standards with a nylon strap 28 that surrounds the tank and passes through notches in the standards 18. At the front of the sprayer, the ends of the strap are connected to eye bolts 30 that are bolted to the standard 20 to tighten the strap to retain the tank in position.

On the left hand side of the sprayer, as viewed from the front (see FIG. 3), is a square tube 32 connected to the side 12d of the base frame and projecting upwardly beside the tank 26. This serves as a receptacle for the nozzle end of a high pressure power washer wand. On the same side of the frame a Y-shaped hose support 34 is bolted to the standard 18 to hold the hose for the washer wand. The hose support consists of a channel section 36 bolted to the standard 18 and a U-shaped rod 38 welded to the top end of the channel.

Figure 3:
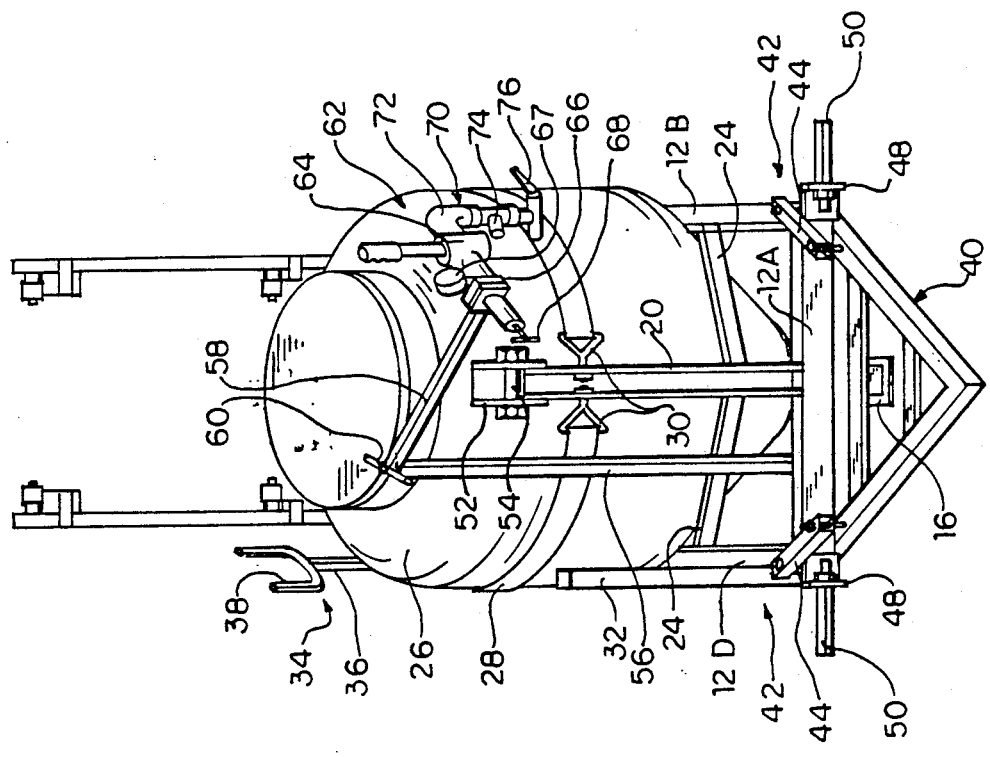
FIG. 3 is a view of the sprayer from the front end above, with the pump and motor unit omitted.

As illustrated most particularly in FIG. 3, there is a V-shaped sub-frame 40 mounted on the front of the base frame 12 by a pair of clamps 42. Each clamp includes a square tube section 44 that extends across the top of one front corner of the base frame 12 and is bolted to one side of the sub-frame 40, which extends across the same corner, below the frame.

Also at the front of the base frame 12, projecting forwardly from the front frame member 12a are two angle brackets 48. These carry respective pins 50 that serve as coupling points for a three point hitch. At the top of the front standard 20 are two plates 52 that carry a third hitch pin 54 to provide the third hitch mounting point.

Along the front base frame member 12a is a standard 56 that projects above the top of the tank 26. A control mounting arm 58 is connected to the top of the standard 56 by a T-bolt coupling 60, so that the control mounting arm can be swung about the standard 56 and then locked in position using the T-bolt. The end of the control mounting arm remote from the standard 56 carries a spraying control 62. This includes an on-off valve 64 for low pressure spraying and a low pressure regulator 66 that is associated with a pressure gauge 67 and a regulator control 68.

A manifold 70 has an outlet elbow 72 connected to the spray control 62 to supply liquid to the low pressure regulator 66 and the spray valve 64. The manifold has an inlet 74 for pressurized liquid and carries a variable agitator valve 76.

Figure 5:
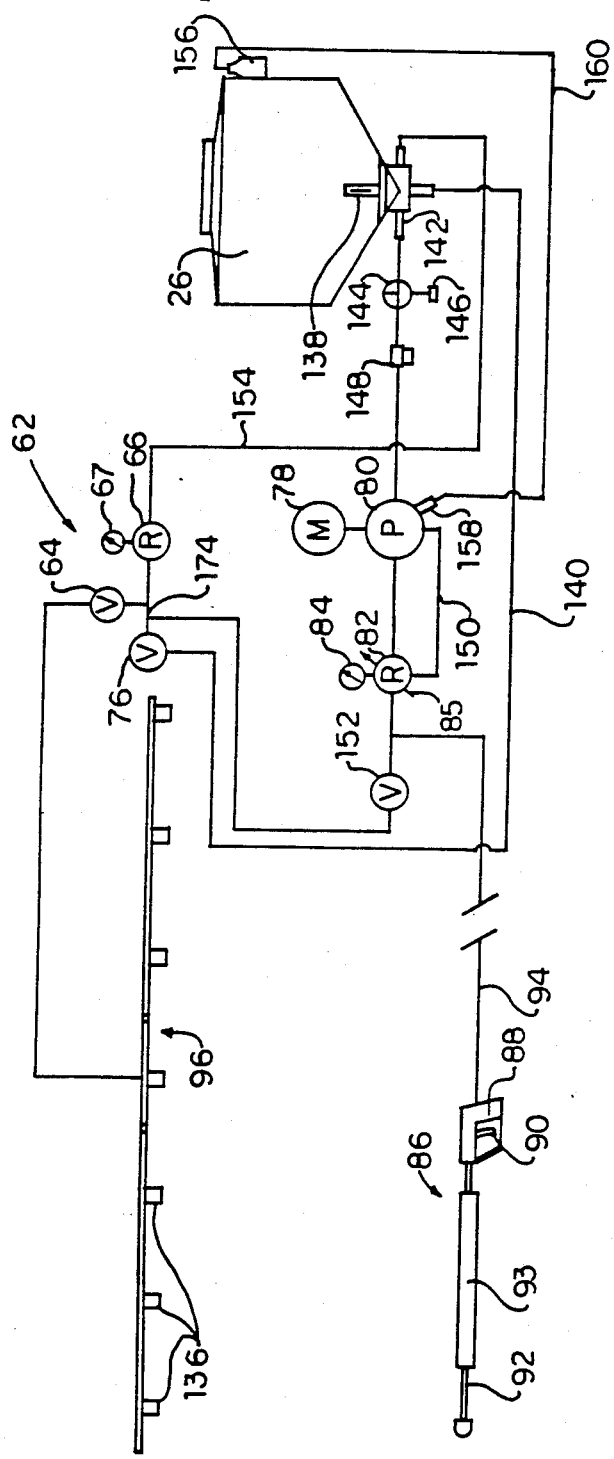
FIG. 5 is a schematic showing the hydraulic circuit for the apparatus.

Referring to FIGS. 1, 3 and 5, the V-shaped sub-frame 40 carries a gasoline motor 78 directly driving a pump 80. The pump is connected to a high pressure regulator 82 with an associated pressure gauge 84. The regulator has a manual control 85 so that the outlet pressure of the regulator can be varied.

The sprayer includes a high pressure power washer wand 86. This includes a pistol grip handle with a hand trigger 90 for controlling a valve in the wand. A barrel 92 with a spray nozzle at the end projects from the handle 88. The barrel is in part surrounded by a vented sheath 93 to protect the hands of the operator if hot water is to be sprayed. The wand 86 is connected to a high pressure hose 94.

Figure 2:
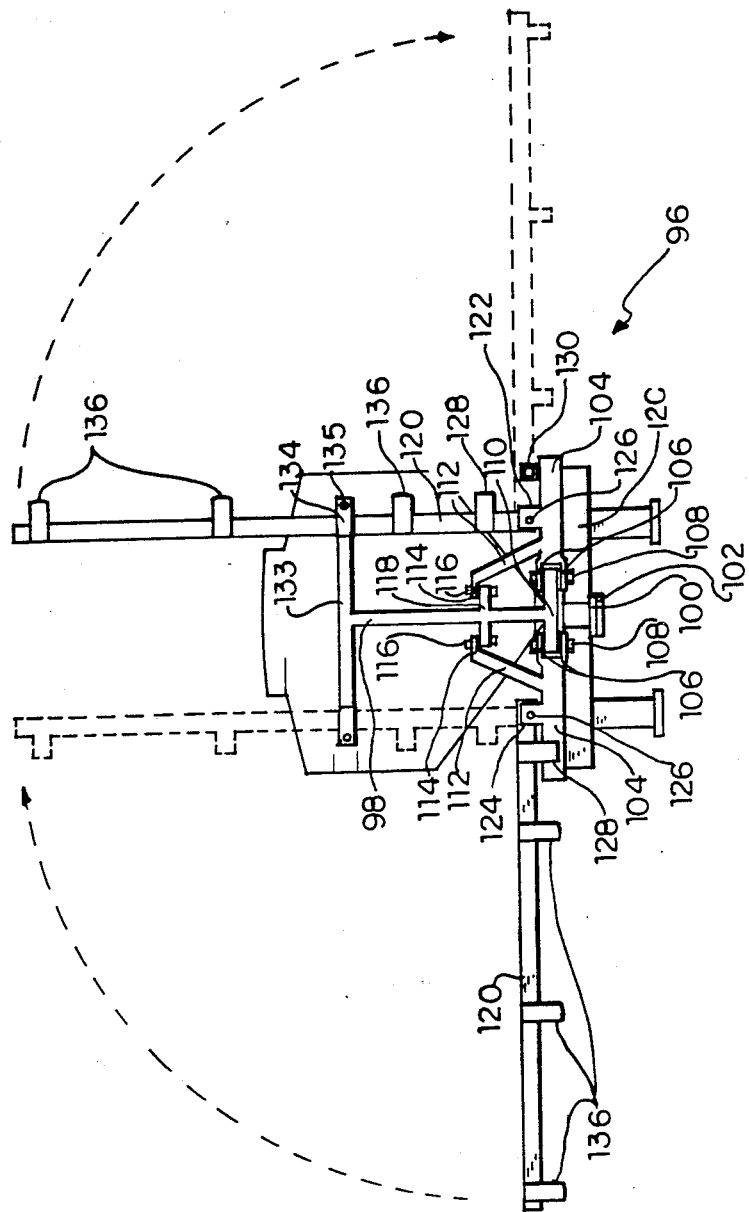
FIG. 2 is an elevation of the sprayer from the rear, showing the spray boom.

As illustrated most particularly in FIG. 2, the sprayer is equipped with a spray boom unit 96. This includes a central standard 98 secured to a mounting plate 100 at the bottom end. The mounting plate is in turn secured to a plate 102 carried by the rear member 12c of the base frame 12. The boom itself has two boom sections, one on either side of the standard. Each section includes an inner part 104 pivotally connected to an outer boom part 120. Each part is a square tube section. The connection between the inner boom part and the standard consists of two plates 106 projecting from respective top and bottom faces of the inner boom part, at its inner end and a vertical bolt 108 through the plates and a cross piece 110 on the standard 98. In addition, a brace 112 slopes upwardly and inwardly from the inner boom part to a position above the plates 106, where it is provided with two similar horizontal plates 114 that are secured by a bolt 116 to another cross piece 118. The bolts 108 and 116 are co-axial so that the boom section can pivot about the common vertical axis of the two bolts.

The outer boom part 120 is pivotally connected to the inner part section 104 with two lugs projecting upwards from the inner part 104 and located on either side of the outer part 120 and a pin 126 passing through the lugs and the arm 120. The pin is oriented front to back of the machine, and horizontally so that the arm 120 can swing upwardly from the in-use position shown at the left at FIG. 2 to the stored position shown at the right in the Figure. The outer part 120 carries a pair of lugs 128 that engage the front and back of the inner part 104 in the in-use position.

To retain the boom sections projecting laterally from opposite sides of the frame, the base frame 12 is equipped with two stops 130, one on either side, to engage the inner parts 104 and limit their pivotal movement towards the front of the sprayer. To retain the boom parts 104 against the stops 130, two elastic straps 132 join the outer ends of the boom parts 104 to the front of the base frame 12. This is most clearly illustrated in FIG. 1. If, during spraying, one of the boom sections encounters an immobile object, for example a fence post, the elastic strap will yield and the boom section will be able to pivot out of the way, ultimately returning to its in-use position under the restoring force of the associated elastic strap 132.

The standard 98 of the spray boom unit projects above the cross piece 118 to a further cross piece 133 which has, at its opposite ends, spaced lugs 134. The lugs at each end receive between them a respective one of the boom parts 120, when it is pivoted upwards to the out of use position illustrated on the right in FIG. 2. The arm is retained in that position by a retainer 135 passing through aligned holes in the two lugs.

The spray boom unit carries a series of spray nozzles 136, one on the standard 98 (not illustrated in FIG. 2) and three spaced uniformly along each boom part 120.

Referring now to FIG. 5, the fluid connections of the device are illustrated. The tank 26 has, at its bottom end, a jet agitator 138. This is used to agitate the contents of the tank during chemical spraying to ensure that chemicals in the tank remain thoroughly mixed with the carrier liquid, usually water. The agitator is operated by carrier liquid supplied through an agitator line 140 from the agitator valve 76.

The outlet 142 from the tank 26 is connected to a three way supply valve 144 that is arranged to draw supply liquid either from the tank 26 or from a hose fitting 146, depending on the setting of the valve. This allows the sprayer to use water directly from a hose or other water supply where it is being used in a relatively static application, for example as a power washer. The outlet from the supply valve 144 passes through a filter 148 to the inlet valve of a high pressure plunger pump 80. Thus, both tank and external water supplies are filtered. The pump delivers high pressure fluid to the high pressure regulator 82. Liquid delivered from the pump in excess of that used in the remainder of the system is by-passed back to the pump through a by-pass line 150. The outlet of the regulator 82 is connected to a high pressure ball valve 152 which, when opened, delivers fluid to the inlet 174 of the manifold 70 at the spraying control head 62. The regulator outlet is also connected to the high pressure hose 94 supplying the wand 86.

The manifold 70 discharges to the agitator valve 76 and to the low pressure regulator 66. The regulator 66 is of the pressure relief type and discharges excess liquid to the tank through a return line 154. The on-off valve 64 that controls the liquid supply to the spray boom assembly 96 is supplied with liquid from upstream of the regulator 66.

When the sprayer is used for high pressure spraying, for example power washing, with the wand 86, it is often desirable to supply an additive to the liquid being sprayed, for example soap. This can be done by providing a small tank 156 of liquid additive connected to an injector valve 158 on the pump 80 by an additive line 160. The additive tank is mounted on the tank 26 by nylon strap 28. The injector is adjustable to meter the appropriate amount of additive into the liquid being passed through the pump. This injection of additive will take place whether the supply of liquid is from the tank 26 or from an external source, such as a water supply line. This is particularly useful where the wand is being used as a power washer and is spraying hot water from a hot water supply.

Figure 4:
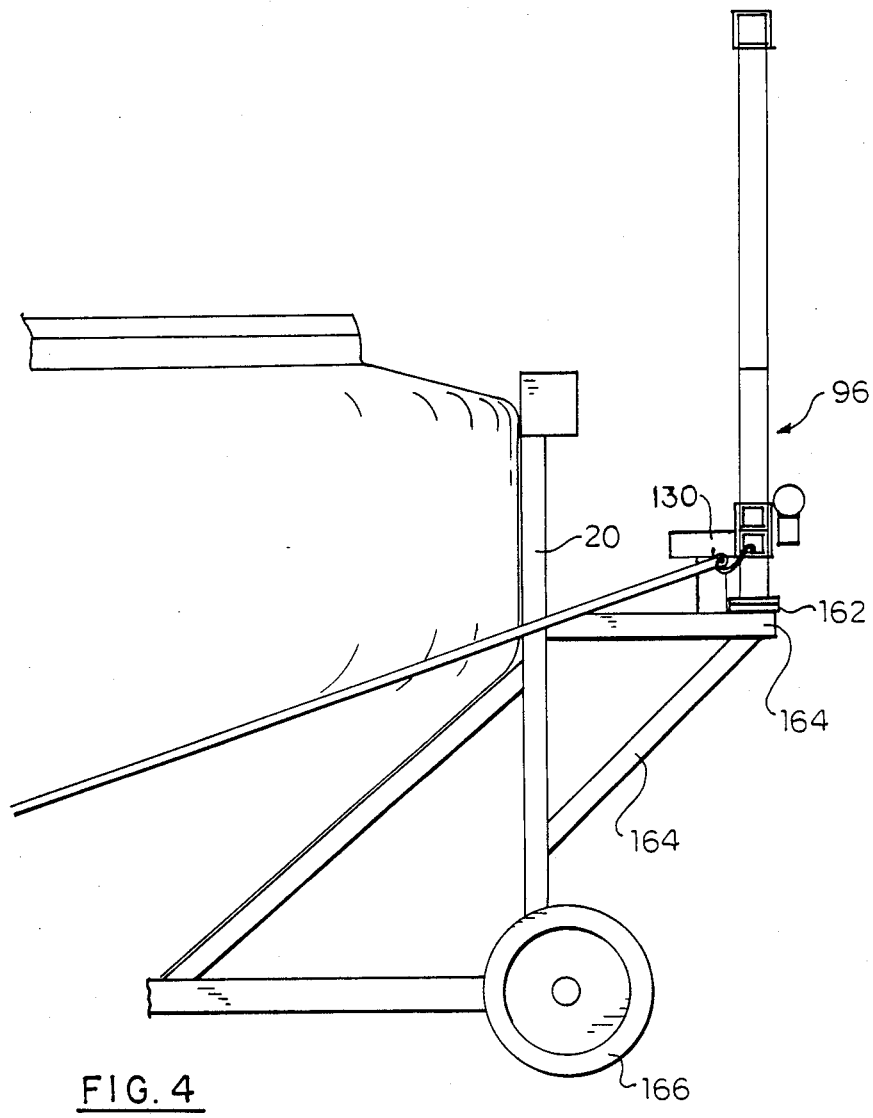
FIG. 4 is a partial side elevation of the apparatus when equipped to be towed as a trailer.

The spray apparatus as thus far described is arranged for connection to a three point hitch. The sprayer can also be skid mounted where desired. Using substantially the same frame components, it can also be arranged as a pull type trailer. To do this, the spray boom unit 96 and the sub-frame 40 are mounted on the opposite ends of the base frame 12 and the hitch pins 50 are replaced with trailer wheels. As illustrated in FIG. 4 the boom unit is mounted on a mounting plate 162 secured to the top of a square beam 164 projecting from the standard 20 and braced with an angle brace 164. The positioning of the boom unit is such that the wheels 166 will not interfere with the spray.

Various components of the sprayer may be standard off-the-shelf components. For example, the motor may be a Honda GX140 utility motor, while the pump may be a Hypro (TM) Series 8600 twin plunger pump. The liquid injector to the pump may be a Hypro (TM) Series 3396-001. The spray wand may be a "Gunjet" spray gun from Spraying Systems Company of Wheaton, Ill. The high pressure regulator may be an "Interpump" series HM automatic unloader valve which is adjustable from 0 to 2,000 psi.

While one specific embodiment of the present invention has been described in the foregoing, it is to be understood that other embodiments are possible within the scope of the invention. The invention is to be considered limited solely by the scope of the appended claims.

I claim:

1. A spraying apparatus comprising:
   a tank for liquid to be sprayed;
   a high pressure pump with an inlet connected to the tank to receive liquid therefrom;
   a high pressure regulator connected to the pump to receive liquid therefrom at high pressure and to deliver liquid at a controlled high pressure;
   high pressure spray means connected to the high pressure regulator to receive liquid at the controlled high pressure and selectively operable to deliver a high velocity spray of liquid;
   high pressure valve means connected to the high pressure regulator to receive liquid at the controlled high pressure for selectively delivering the liquid therefrom;
   a low pressure regulator connected to the high pressure valve means to receive liquid therefrom and for providing a supply of the liquid at a controlled low pressure; and
   low pressure spray means connected to the low pressure regulator to receive liquid at the controlled low pressure and for delivering the liquid in a controlled low velocity spray.

2. An apparatus according to claim 1 including an additive container substantially smaller than the tank for containing an additive and injector means for injecting the additive from the additive container into the pump for mixing the additive with the liquid.

3. Apparatus according to claim 2 wherein the injector means comprise an adjustable injector valve mounted on the pump inlet.

4. Apparatus according to claim 1 including a supply valve connected between the tank and the pump.

5. Apparatus according to claim 4 wherein the supply valve is a three-way valve with an inlet adapted for connection to an external water supply.

6. Apparatus according to claim 1 wherein the high pressure pump is a plunger pump.

7. Apparatus according to claim 1 wherein the high pressure regulator is adjustable to vary the controlled high pressure of the liquid.

8. Apparatus according to claim 1 wherein the high pressure valve mean comprises a high pressure ball valve.

9. Apparatus according to claim 1 wherein the low pressure regulator is adjustable to vary the controlled low pressure of the liquid.

10. Apparatus according to claim 9 including a spray control valve connected between the low pressure regulator and the low pressure spray means.

11. Apparatus according to claim 10 wherein the spray control valve is a two position on-off valve.

12. Apparatus according to claim 9 including a return connection from the low pressure regulator to the tank for returning excess liquid to the tank.

13. Apparatus according to claim 1 including jet agitator means in the tank for agitating the contents thereof, the jet agitating means being connected to a liquid line between the low pressure regulator and the high pressure valve means for receiving pressurized liquid therefrom.

14. Apparatus according to claim 13 including agitator valve means connected to the liquid line between the low pressure and high pressure regulators and the agitator for controlling liquid flow to the agitator.

15. Apparatus according to claim 14 wherein the agitator valve means is a variable valve for selectively varying the liquid flow to the agitator.

16. Apparatus according to claim 1 wherein the tank is a cone bottom tank.

17. Apparatus according to claim 16 wherein the tank has a capacity of from 2 to 200 gallons.

18. Apparatus according to claim 1 wherein the high pressure spray means comprises a spray wand.

19. Apparatus according to claim 1 wherein the low pressure spray means comprises a spray boom with plural spray nozzles thereon.

20. A spraying apparatus comprising:
   a base frame:
   a tank carried by the base frame:
   a pump mounted on the frame for receiving liquid from the tank:
   a high pressure regulator mounted on the frame to receive liquid from the pump and for delivering liquid at a controlled pressure;
   a low pressure regulator connected to the high pressure regulator to receive liquid therefrom;
   a high pressure spray wand connected to the high pressure regulator to receive liquid therefrom at the controlled high pressure, for selectively spraying liquid;
   a low pressure spray boom mounted on the frame and carrying nozzles connected to the low pressure regulator to receive liquid at low pressure therefrom; and valve means between the high pressure and low pressure regulators.

21. Apparatus according to claim 20 including wheels mounted on the frame.

22. Apparatus according to claim 21 including a drawbar mounted on the frame.

23. Apparatus according to claim 20 including a three point hitch means mounted on the frame.

* * * * *